US009738313B2

United States Patent
Yang et al.

(10) Patent No.: US 9,738,313 B2
(45) Date of Patent: Aug. 22, 2017

(54) MOTOR-ASSISTED JOINT SYSTEM FOR ARTICULATED BUS

(71) Applicant: Aleees Eco Ark Co. Ltd., Bade, Taoyuan County (TW)

(72) Inventors: Anthony Antao Yang, Bade (TW); Gordon Ching Chen, Bade (TW)

(73) Assignee: ALEEES ECO ARK (CAYMAN) CO., LTD, Grand Cayman (KY)

( * ) Notice: Subject to any disclaimer, the term of this patent is extended or adjusted under 35 U.S.C. 154(b) by 0 days.

(21) Appl. No.: 15/029,874

(22) PCT Filed: Oct. 16, 2013

(86) PCT No.: PCT/CN2013/085325
§ 371 (c)(1),
(2) Date: Apr. 15, 2016

(87) PCT Pub. No.: WO2015/054846
PCT Pub. Date: Apr. 23, 2015

(65) Prior Publication Data
US 2016/0236711 A1    Aug. 18, 2016

(51) Int. Cl.
*B62D 13/00* (2006.01)
*B62D 47/02* (2006.01)
*B60D 5/00* (2006.01)

(52) U.S. Cl.
CPC .............. *B62D 13/005* (2013.01); *B60D 5/00* (2013.01); *B62D 13/00* (2013.01); *B62D 47/025* (2013.01)

(58) Field of Classification Search
CPC ................ B62D 47/025; B60D 1/00

USPC ............................................... 280/455.1, 492
See application file for complete search history.

(56) References Cited

U.S. PATENT DOCUMENTS

| 4,249,629 A | 2/1981 | Hutt |
| 6,170,682 B1 * | 1/2001 | Sugimoto ............... B61G 5/02 105/176 |
| 6,688,631 B1 * | 2/2004 | Andre ..................... B60D 1/32 280/432 |

(Continued)

FOREIGN PATENT DOCUMENTS

| CN | 201169307 | 12/2008 |
| CN | 201446982 U | 5/2010 |

(Continued)

OTHER PUBLICATIONS

Chen Jun et al., Automatic Reversing Motion of a Tractor-Trailer Vehicle, Transactions of the CSAE, Oct. 2005, p. 82-85, vol. 21, College of Mechanical and Electronic Engineering, Northwest Sci-tech University or Agriculture and Forestry, Morioka, Japan.

*Primary Examiner* — Tony Winner
(74) *Attorney, Agent, or Firm* — Kirton McConkie; Evan R. Witt

(57) ABSTRACT

A motor-assisted joint system is provided to improve maneuverability and safety of an articulated bus. The motor-assisted joint system is enabled when the articulated bus is operated in an active damping mode. An articulated joint with a flat motor is used. According to the velocity of the articulated bus, a highly sensitive damping force is calculated and an opposing force is generated to balance the inertia of the articulated bus when an oversteering event or a tire slip event occurs. Consequently, the driving performance of the articulated bus in various aspects is enhanced.

9 Claims, 5 Drawing Sheets

(56) References Cited

U.S. PATENT DOCUMENTS

| | | | |
|---|---|---|---|
| 9,199,640 B2* | 12/2015 | Weston | B60W 10/16 |
| 2004/0021291 A1* | 2/2004 | Haug | B60D 1/30 |
| | | | 280/455.1 |
| 2006/0138746 A1* | 6/2006 | Donnard | B60D 1/242 |
| | | | 280/492 |
| 2009/0152831 A1* | 6/2009 | Verhagen | B60D 1/065 |
| | | | 280/455.1 |
| 2010/0013190 A1* | 1/2010 | Koch | B60D 1/30 |
| | | | 280/492 |
| 2012/0018980 A1* | 1/2012 | Karasek | B60D 5/00 |
| | | | 280/506 |

FOREIGN PATENT DOCUMENTS

| | | |
|---|---|---|
| CN | 102897115 | 1/2013 |
| CN | 103057586 | 4/2013 |
| DE | 3331921 | 3/1984 |
| DE | 3305751 | 8/1984 |
| DE | 3340446 | 5/1985 |
| EP | 0253964 | 1/1988 |
| FR | 2541217 | 8/1984 |
| GB | 2069428 | 8/1981 |
| GB | 2365398 | 2/2002 |
| JP | S47034842 | 9/1972 |
| JP | S60146761 | 8/1985 |
| JP | S60146764 | 8/1985 |
| JP | S60146765 | 8/1985 |
| JP | S60150110 | 10/1985 |
| JP | S64041479 | 2/1989 |
| JP | H01266078 | 10/1989 |
| JP | 2003315486 | 11/2003 |
| JP | 2009269478 A | 11/2009 |
| JP | 2010132238 | 6/2010 |
| JP | 2010254125 | 11/2010 |

* cited by examiner

MOTOR-ASSISTED JOINT SYSTEM FOR ARTICULATED BUS

FIELD OF THE INVENTION

The present invention relates to a motor-assisted joint system for an articulated bus, and more particularly to a joint using a flat motor to adjust the angle of the joint and generating an opposing force to balance a torsion force from a front frame and a trailer frame. Consequently, the driving stability of the articulated bus is increased, and the safety and comfort of driving the articulated bus are enhanced. The present invention is applied to the field of the articulated bus.

BACKGROUND OF THE INVENTION

Generally, the commercially available articulated bus uses a hydraulic damping system to stabilize the body of the articulated bus while the articulated bus is turned or driven at a high velocity. However, in case that sudden shock or tire slip occurs, the hydraulic damping system cannot make an immediate response. Consequently, it is difficult for the current wheel traction system to control the angle of the joint. When the articulated bus is driven at a high velocity, a trailer frame of the articulated bus is unavoidably subjected to shake. If the passenger has many choices, the passenger prefers the ordinary bus because the comfort of the articulated bus is unsatisfied.

SUMMARY OF THE INVENTION

An object of the present invention provides a motor-assisted joint system for increasing the stability and comfort of driving an articulated bus.

Another object of the present invention provides a motor-assisted joint system for calculating and generating a highly sensitive damping force according to a velocity of an articulated bus so as to avoid undesired shake.

A further object of the present invention provides a motor-assisted joint system. When an oversteering event or a tire slip event occurs, the motor-assisted joint system generates an opposing force to balance the inertia of the articulated bus. Consequently, the joint angle is quickly adjusted to a safe range, and the performance and safety of driving the articulated bus are enhanced.

In accordance with an aspect of the present invention, there is provided a motor-assisted joint system for an articulated bus. The motor-assisted joint system includes an upper stator part, a lower stator part, a flat rotator part and a suspension arm. The upper stator part and the lower stator part are installed on a front frame. The flat rotator part is coaxially arranged between the upper stator part and the lower stator part through at least one bearing. The suspension arm is installed on a trailer frame. The suspension arm is pivotally coupled to extension structures of the flat rotator part through a horizontal shaft, so that the front frame and the trailer frame are movable upwardly or downwardly.

In an embodiment, the motor-assisted joint system for an articulated bus further includes a velocity sensor, a steering wheel position sensor and a control unit. The control unit reads a velocity data from the velocity sensor and a position data from the steering wheel position sensor, and adjusts a target joint angle according to the velocity data and the position data.

In an embodiment, the control unit performs a computing method of setting a low velocity limit and judging whether a turning action of the flat rotator part is allowed according to the low velocity limit.

In an embodiment, the control unit limits the turning action of the flat rotator part according to the velocity data.

In an embodiment, the control unit increases the target joint angle when the articulated bus is in a reverse mode.

In accordance with another aspect of the present invention, there is provided a motor-assisted joint system for an articulated bus. The motor-assisted joint system includes a motor-assist joint, a joint base, an extension structure, a velocity sensor, a steering wheel position sensor and a control unit. The motor-assist joint includes a stator main body and a rotator. The joint base is connected with the stator main body and a front frame. The extension structure is used for connecting the stator main body to a trailer frame through a suspension arm and allowing the trailer frame to be moved in a vertical direction. The control unit adjusts a target joint angle according to a velocity data from the velocity sensor and a steering wheel position data from the steering wheel position sensor.

In an embodiment, the control unit performs a computing method of setting a first velocity limit and a second velocity limit. The control unit judges whether a turning action of the motor-assist joint is allowed according to the first velocity limit. Moreover, the control unit limits the turning action of the motor-assist joint according to the second velocity limit.

In an embodiment, the control unit performs a computing method of calculating a proper joint angle according to the steering wheel position data and the velocity data. If the velocity data is positive, the target joint angle is smaller than a steering angle of a front wheel of the articulated bus. If the velocity data is negative, the target joint angle is larger than the steering angle of the front wheel of the articulated bus.

In an embodiment, the control unit performs a computing method of controlling a turning speed of the motor-assisted joint. The turning speed is determined according to a relation formula between the velocity data and the target joint angle.

In an embodiment, if the control unit detects that the steering wheel position data is unchanged, the control unit instructs the motor-assisted joint to maintain the target joint angle.

In accordance with an aspect of the present invention, there is provided a motor-assisted joint system for an articulated vehicle having a steerable front axle. The motor-assisted joint system includes an upper stator part, a lower stator part, a flat rotator part and a suspension arm. The upper stator part and the lower stator part are installed on a front frame. The flat rotator part is coaxially arranged between the upper stator part and the lower stator part through at least one bearing. The suspension arm is installed on a trailer frame. The suspension arm is pivotally coupled to extension structures of the flat rotator part through a horizontal shaft, so that the front frame and the trailer frame are movable upwardly or downwardly.

The above contents of the present invention will become more readily apparent to those ordinarily skilled in the art after reviewing the following detailed description and accompanying drawings, in which:

DETAILED DESCRIPTION OF THE PREFERRED EMBODIMENT

In accordance with the concept of the present invention, a highly sensitive articulated joint system is provided. The articulated joint system is capable of increasing the driving performance of an articulated bus and providing the integrity of the driving system. Generally, the articulated bus comprises a front frame and a trailer frame. Moreover, a set of steering front wheels, a set of intermediate wheels and a set of rear wheels are installed on the front frame and the trailer frame. Generally, a driving shaft is connected with the rear wheels of the articulated bus in order to drive the articulated bus.

Figure 1:
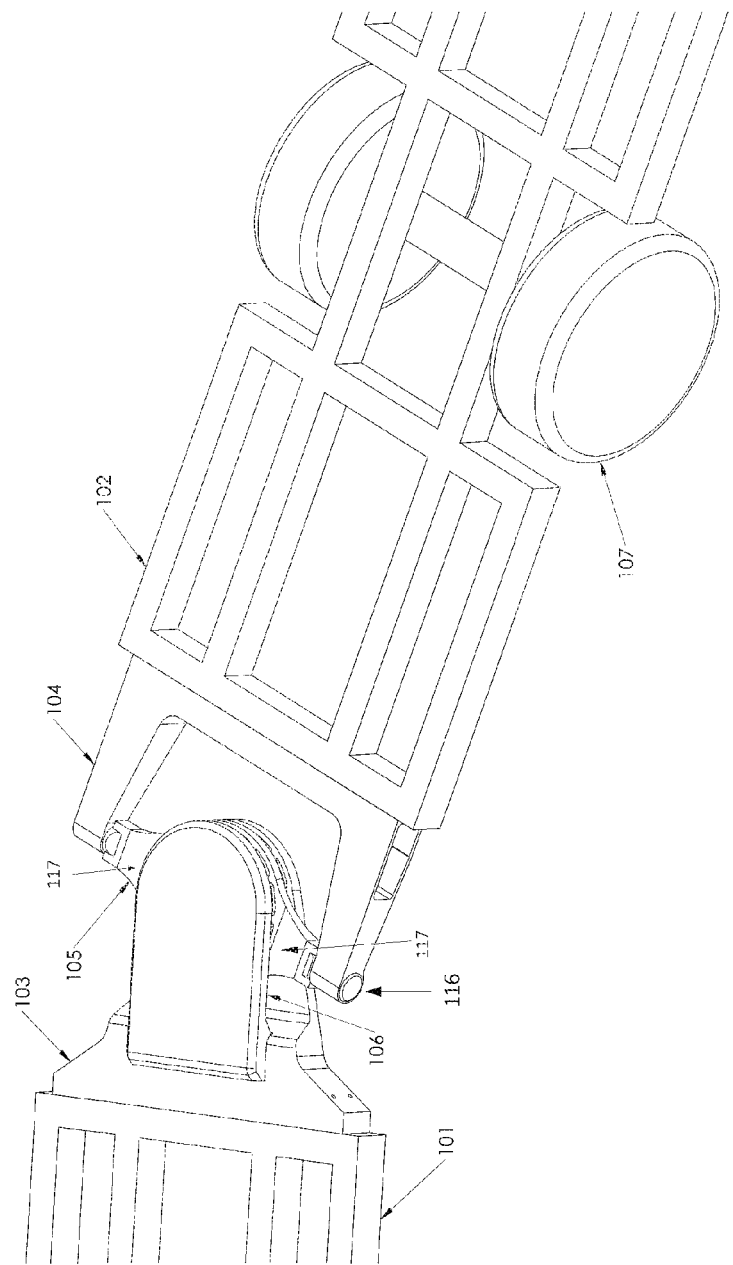
FIG. 1 is a schematic isometric view illustrating a motor-assisted joint system for an articulated bus according to an embodiment of the present invention.
Figure 2:
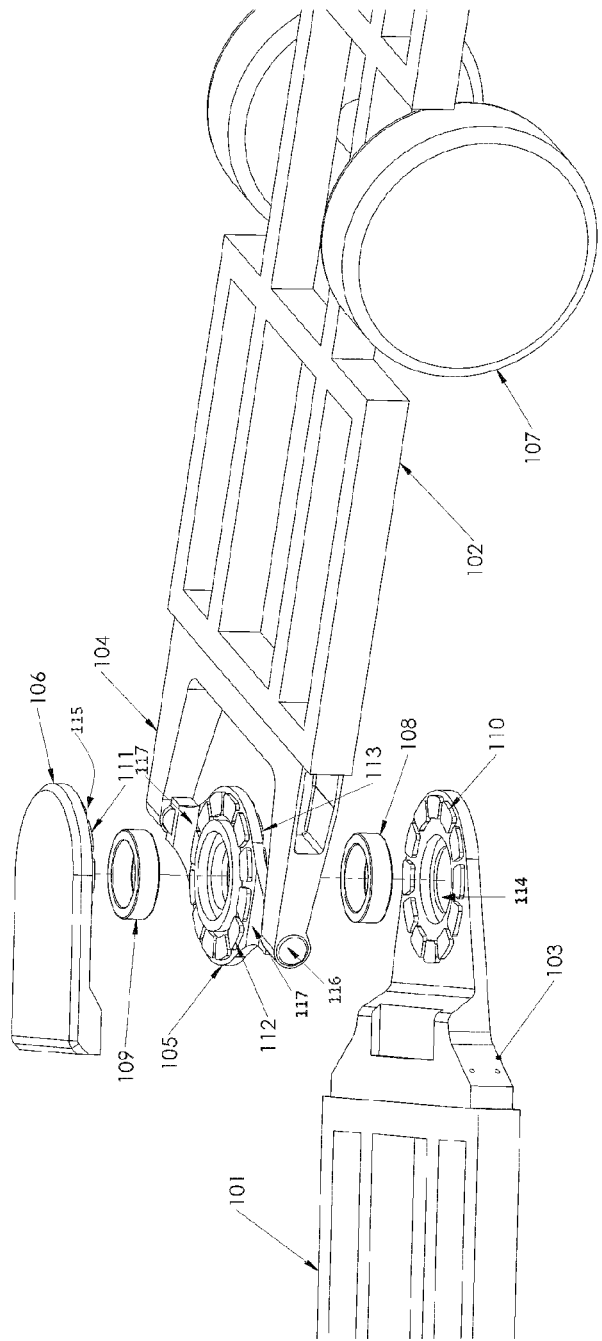
FIG. 2 is a schematic exploded view illustrating the motor-assisted joint system for the articulated bus according to the embodiment of the present invention.

FIGS. 1 and 2 schematically illustrate the components of a motor-assisted joint system 1 for an articulated bus according to an embodiment of the present invention. The motor-assisted joint system 1 comprises an upper stator part 106, a lower stator part 103, a flat rotator part 105, an upper bearing 109 and a lower bearing 108. The upper stator part 106 and the lower stator part 103 are installed on a front frame 101. The flat rotator part 105 is arranged between the upper stator part 106 and the lower stator part 103. The flat rotator part 105 comprises two rotator extension structures 117, which are connected with a suspension arm 104 through a horizontal shaft 116. Through the rotator extension structures 117, the front frame 101 and a trailer frame 102 are movable upwardly or downwardly relative to each other. The upper bearing 109 is installed in an upper bearing recess 115, and arranged between the flat rotator part 105 and the upper stator part 106. The lower bearing 108 is installed in a lower bearing recess 114, and arranged between the flat rotator part 105 and the lower stator part 103. Consequently, the front frame 101 and the trailer frame 102 are rotatable relative to each other.

Figure 3:
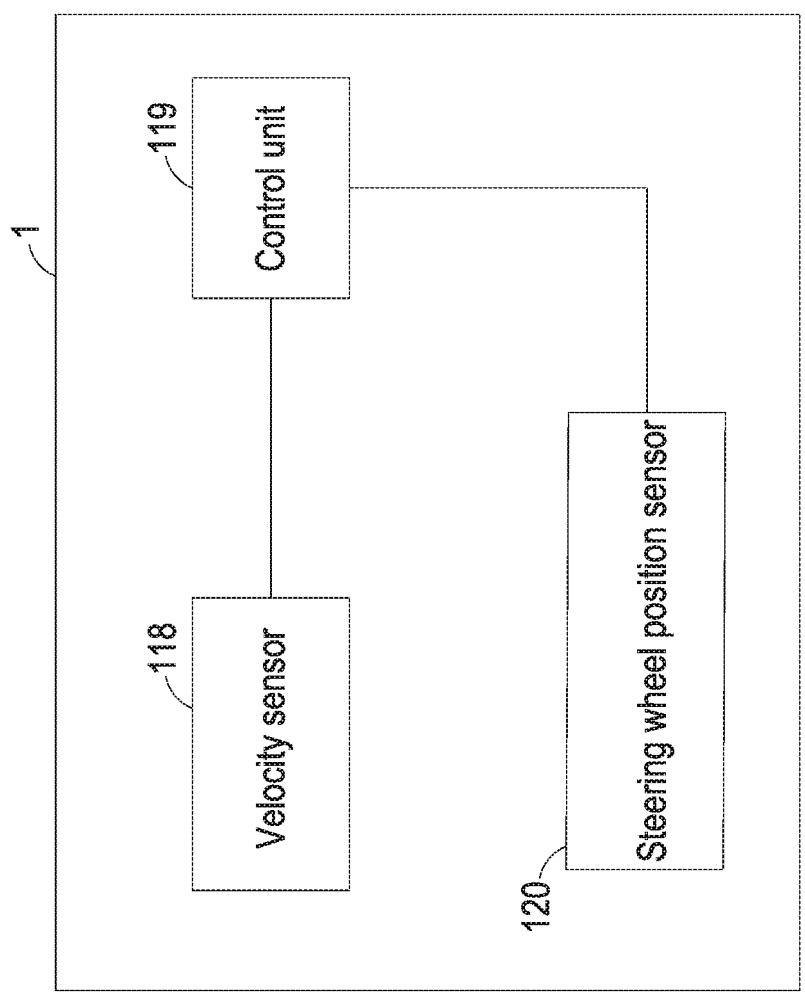
FIG. 3 is a block diagram of the motor-assisted joint system and the relationship of the velocity sensor, control unit, and steering wheel position sensor.

As shown in FIG 3, the motor-assisted joint system 1 further comprises velocity sensor 118, a control unit 119 and a steering wheel position sensor 120. The control unit 119 is used for reading a steering wheel position data of a steering wheel from the steering wheel position sensor 120, for reading a street position, for reading velocity of the articulated bus from the velocity sensor 118 and for reading any other appropriate information.

Figure 4:
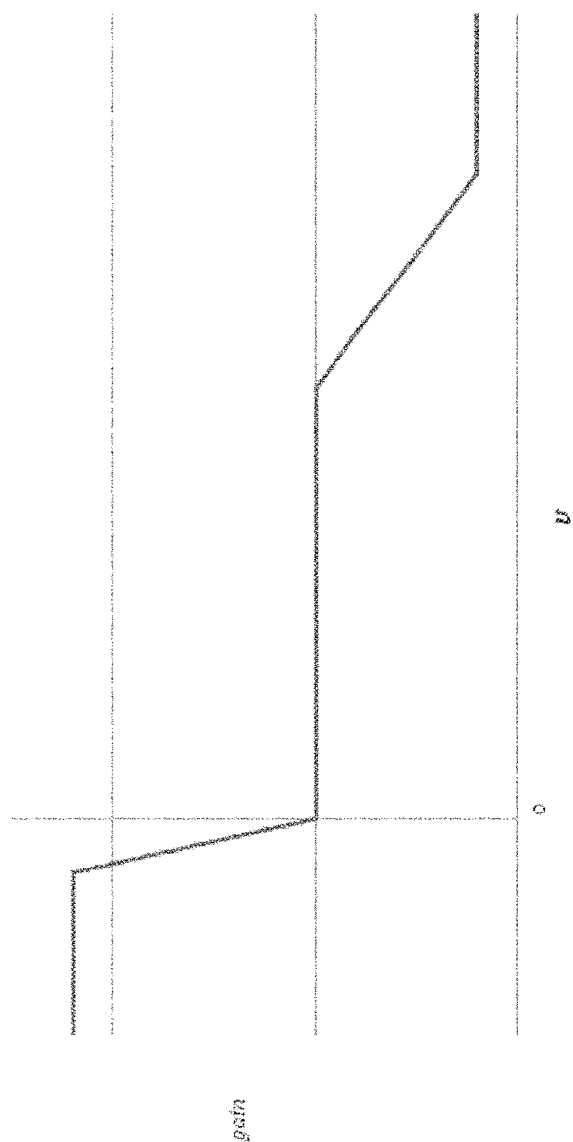
FIG. 4 is a plot illustrating the relationship between the position of the steering wheel and the target joint angle at different velocities.

A control method of the present invention will be illustrated with reference to FIG.4. As shown in FIG. 4, the control unit sets different gain values of the target joint angle according to different velocities. In case that the articulated bus is linearly advanced at a higher velocity, the target joint angle is smaller when compared with the articulated bus at a lower velocity. For example, if the steering wheel is turned 10 degrees when the articulated bus performs a lane-changing action at a velocity of about 40 miles per hour, the target joint angle is set as 5 degrees by the control unit. Consequently, the stability is increased. Whereas, if the steering wheel is turned 10 degrees when the articulated bus performs a lane-changing action at a velocity of about 5 miles per hour, the target joint angle is set as 8 degrees by the control unit. Consequently, the steering action is smoother. In other words, the control unit adjusts the target joint angle according to the detected velocity.

Please refer to FIG. 4 again. As the velocity of the articulated bus is increased to exceed a low velocity limit, the gain of the target joint angle corresponding to the position of the steering wheel is higher because a steering action needs a larger joint angle. As the velocity of the articulated bus is increased to exceed a high velocity limit, the gain of the target joint angle corresponding to the position of the steering wheel is reduced. Consequently, the stability of the lane-changing action is enhanced.

Please refer to FIG. 4 again. While the articulated bus is reversed, the gain of the target joint angle corresponding to the position of the steering wheel is obviously increased because the transmission shaft of the articulated bus is installed in the trailer axle. Because of the position of the trailer axle, an opposing force is generated while the articulated bus is reversed. In response to the opposing force, the articulated joint is pulled to a vertical direction. Moreover, for allowing the articulated bus to be driven on a smoother reverse track, a larger gain is required in the reverse mode. Consequently, while the articulated bus is reversed, the control unit needs to increase the value of the target joint angle.

Figure 5:
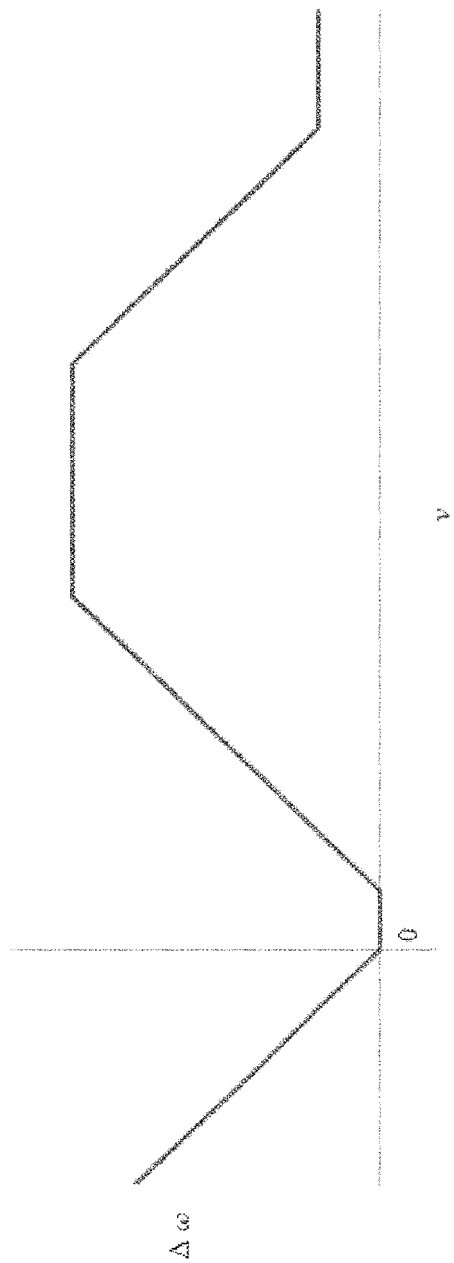
FIG. 5 is a plot illustrating the maximum allowable velocity of the motor-assisted joint at different velocities.

Another implementation example of the control method is shown in FIG. 5. The maximum angular velocity of the joint is determined according to the vehicle velocity. In the positive zone close to zero, the articulated bus is driven at a slow velocity in order to properly control the motor-assisted joint and avoid tire wear. If the velocity of the articulated bus does not exceed a specified velocity limit, the joint angle of the hydraulic turntable is not changed. Consequently, it is necessary to define a standard velocity value to judge whether a turning action of the moto-assisted joint is allowed.

Please refer to FIG. 5 again. In case that the vehicle velocity exceeds a high velocity limit, the maximum angular velocity of the moto-assisted joint is limited by the control unit because the stability and comfort of driving the articulated bus are influenced by the tuning speed of the hydraulic turntable. This situation usually happens when the articulated bus is driven on a super highway. Consequently, the maximum angular velocity of the moto-assisted joint is directly adjusted and judged according to the velocity of the articulated bus.

Please refer to FIGS. 1 and 2 again. The rotator part is equipped with magnets. The stator part is equipped with coils. It is noted that the functions of the magnets and the coils may be exchanged.

What is claimed is:

1. A motor-assisted joint system for an articulated bus, the motor-assisted joint system comprising:
    an upper stator part and a lower stator part installed on a front frame;
    a flat rotator part coaxially arranged between the upper stator part and the lower stator part through at least one bearing;
    a suspension arm installed on a trailer frame, wherein the suspension arm is pivotally coupled to extension structures of the flat rotator part through a horizontal shaft, so that the front frame and the trailer frame are movable upwardly or downwardly;
    a velocity sensor;
    a steering wheel position sensor; and
    a control unit reading data from a velocity data from the velocity sensor and a steering wheel position data from the steering wheel position sensor, and adjusting a target joint angle according to the velocity data and the steering wheel position data.

2. The motor-assisted joint system for the articulated bus according to claim 1, wherein the control unit performs a computing method of setting a low velocity limit and judging whether a turning action of the flat rotator part is allowed according to the low velocity limit.

3. The motor-assisted joint system for the articulated bus according to claim 2, wherein the control unit limits the turning action of the flat rotator part according to the velocity data.

4. The motor-assisted joint system for the articulated bus according to claim 3, wherein the control unit increases the target joint angle when the articulated bus is in a reverse mode.

5. The motor-assisted joint system for the articulated bus according to claim 1, wherein the control unit performs a computing method of setting a first velocity limit and a second velocity limit, wherein the control unit judges whether a turning action of the motor-assist joint is allowed according to the first velocity limit, and the control unit limits the turning action of the motor-assist joint according to the second velocity limit.

6. The motor-assisted joint system for the articulated bus according to claim 5, wherein the control unit performs a computing method of calculating a proper joint angle according to the steering wheel position data and the velocity data, wherein if the velocity data is positive, the target joint angle is smaller than a steering angle of a front wheel of the articulated bus, wherein if the velocity data is negative, the target joint angle is larger than the steering angle of the front wheel of the articulated bus.

7. The motor-assisted joint system for the articulated bus according to claim 6, wherein the control unit performs a computing method of controlling a turning speed of the motor-assisted joint, wherein the turning speed is determined according to a relation formula between the velocity data and the target joint angle.

8. The motor-assisted joint system for the articulated bus according to claim 7, wherein if the control unit detects that the steering wheel position data is unchanged, the control unit instructs the motor-assisted joint to maintain the target joint angle.

9. A motor-assisted joint system for an articulated vehicle having a steerable front axle, the motor-assisted joint system comprising:
- an upper stator part and a lower stator part installed on a front frame;
- a flat rotator part coaxially arranged between the upper stator part and the lower stator part through at least one bearing;
- a suspension arm installed on a trailer frame, wherein the suspension arm is pivotally coupled to extension structures of the flat rotator part through a horizontal shaft, so that the front frame and the trailer frame are movable upwardly or downwardly;
- a velocity sensor;
- a steering wheel position sensor; and
- a control unit reading data from a velocity data from the velocity sensor and a steering wheel position data from the steering wheel position sensor, and adjusting a target joint angle according to the velocity data and the steering wheel position data.

* * * * *